US012536197B1

(12) United States Patent
Lagu et al.

(10) Patent No.: US 12,536,197 B1
(45) Date of Patent: Jan. 27, 2026

(54) FAST AGGREGATION AND INGESTION OF MULTIDIMENSIONAL DATA

(71) Applicant: Planful, Inc., Redwood City, CA (US)

(72) Inventors: Vikram Vivek Lagu, Hyderabad (IN); Narendra Reddy Bandi, Hyderabad (IN)

(73) Assignee: Planful, Inc., San Francisco, CA (US)

( * ) Notice: Subject to any disclaimer, the term of this patent is extended or adjusted under 35 U.S.C. 154(b) by 0 days.

(21) Appl. No.: 17/960,030

(22) Filed: Oct. 4, 2022

Related U.S. Application Data

(60) Provisional application No. 63/337,141, filed on May 1, 2022.

(51) Int. Cl.
| | |
|---|---|
| *G06F 16/28* | (2019.01) |
| *G06F 16/22* | (2019.01) |
| *G06F 16/2455* | (2019.01) |
| *G06F 16/25* | (2019.01) |

(52) U.S. Cl.
CPC ........ *G06F 16/283* (2019.01); *G06F 16/2264* (2019.01); *G06F 16/24556* (2019.01); *G06F 16/254* (2019.01)

(58) Field of Classification Search
CPC ............... G06F 16/283; G06F 16/2264; G06F 16/24556; G06F 16/254
See application file for complete search history.

(56) References Cited

U.S. PATENT DOCUMENTS

| | | | | |
|---|---|---|---|---|
| 6,766,325 | B1* | 7/2004 | Pasumansky | G06F 16/248 |
| | | | | 707/999.102 |
| 7,133,858 | B1* | 11/2006 | Larson | G06F 16/24556 |
| 8,161,070 | B2* | 4/2012 | Dipper | G06F 16/283 |
| | | | | 707/790 |
| 9,053,160 | B2* | 6/2015 | Lanphear | G06F 16/254 |
| 9,405,811 | B2* | 8/2016 | Eshleman | G06F 16/254 |
| 10,319,044 | B2* | 6/2019 | Bean | G06Q 40/128 |
| 11,023,485 | B2* | 6/2021 | Zhang | G06F 16/24539 |
| 11,204,934 | B2* | 12/2021 | Demonsant | G06F 16/283 |
| 12,111,809 | B2* | 10/2024 | Srinivasulu | G06F 16/283 |
| 2002/0165724 | A1* | 11/2002 | Blankesteijn | G06F 16/2308 |
| | | | | 705/1.1 |
| 2022/0228926 | A1* | 7/2022 | Hironaka | G01K 1/08 |

* cited by examiner

*Primary Examiner* — Debbie M Le
(74) *Attorney, Agent, or Firm* — Adibi IP Group, PC; Amir V. Adibi; Andrew C. Palmer

(57) ABSTRACT

A multidimensional data aggregation and ingestion system includes a multidimensional data aggregation and ingestion computing device that ingests data received from one or more sources. During operation, data is received from one or more internal or external data sources. Next, received data is aggregated in accordance with aggregation rules. Next, delta information is determined by comparing received data to stored data in accordance with delta determination rules. Next, delta information is appended to the stored data. Data is ingested without deleting stored data. A stored multidimensional array data structure is updated based on received data without generating a new stored multidimensional array data structure. For example, a "Process Add" method provided by SQL Server Analysis Services (SSAS) is used to append delta information to a stored Online Analytical Processing (OLAP) cube. The novel system ingests significant quantities of data without needing to generate new OLAP cubes on each ingestion operation.

20 Claims, 14 Drawing Sheets

OPERATION OF MULTIDIMENSIONAL DATA AGGREGATION AND INGESTION SYSTEM

MULTIDIMENSIONAL DATA AGGREGATION AND
INGESTION SYSTEM

OPERATION OF MULTIDIMENSIONAL DATA
AGGREGATION AND INGESTION SYSTEM

DETAILED DIAGRAM OF MULTIDIMENSIONAL DATA AGGREGATION AND INGESTION COMPUTING DEVICE

GENERATE OLAP CUBE

EXAMPLE OF GENERATED OLAP CUBE

FIRST INGESTION OPERATION

STAGING, AGGREGATION, AND DELTA CALCULATION
OF FIRST INGESTION OPERATION

APPEND DELTA INFORMATION TO STORED DATA

OLAP CUBE AFTER FIRST INGESTION OPERATION
(NO GENERATION OF NEW OLAP CUBE)

SECOND INGESTION OPERATION

STAGING, AGGREGATION, AND DELTA CALCULATION
OF SECOND INGESTION OPERATION

APPEND DELTA INFORMATION TO STORED DATA

OLAP CUBE AFTER SECOND INGESTION OPERATION
(NO GENERATION OF NEW OLAP CUBE)

FAST AGGREGATION AND INGESTION OF MULTIDIMENSIONAL DATA

CROSS REFERENCE TO RELATED APPLICATIONS

This application claims the benefit under 35 U.S.C. § 119 from U.S. Provisional Patent Application Ser. No. 63/337,141, entitled "System To Process General Ledger Data In Cache With Delta Detection," filed on May 1, 2022, the subject matter of which is incorporated herein by reference.

TECHNICAL FIELD

The present invention relates generally to data processing, and more specifically, to ledger data processing systems.

BACKGROUND INFORMATION

Business enterprises typically involve commercial activities across many categories. Most businesses utilize enterprise resource planning (ERP) systems to manage these business processes. ERP systems collect, generate, and output data that span many dimensions. Such multidimensional data is used by businesses to manage operations and gain insights on how their businesses operate.

SUMMARY

A multidimensional data aggregation and ingestion system includes a multidimensional data aggregation and ingestion computing device that ingests data received from one or more sources. During operation, data is received from one or more internal or external data sources. Next, received data is aggregated in accordance with aggregation rules. Next, delta information is determined by comparing received data to stored data in accordance with delta determination rules. Next, delta information is appended to the stored data. Data is ingested without deleting or replacing stored data. A stored multidimensional array data structure is updated based on received data without generating a new stored multidimensional array data structure. Generating new stored multidimensional array data structures tends to be a computationally costly process, especially when significant quantities of data are ingested in each ingestion cycle.

In one embodiment, the database system is an SQL Server Analysis Services (SSAS) database, the database is an RDBMS, and the multidimensional array data structure is an Online Analytical Processing (OLAP) cube. The multidimensional data aggregation and ingestion computing device uses the "Process Add" method provided by SSAS to append delta information to a stored OLAP cube. The novel multidimensional data aggregation and ingestion system ingests significant quantities of data without needing to generate new OLAP cubes on each ingestion operation.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
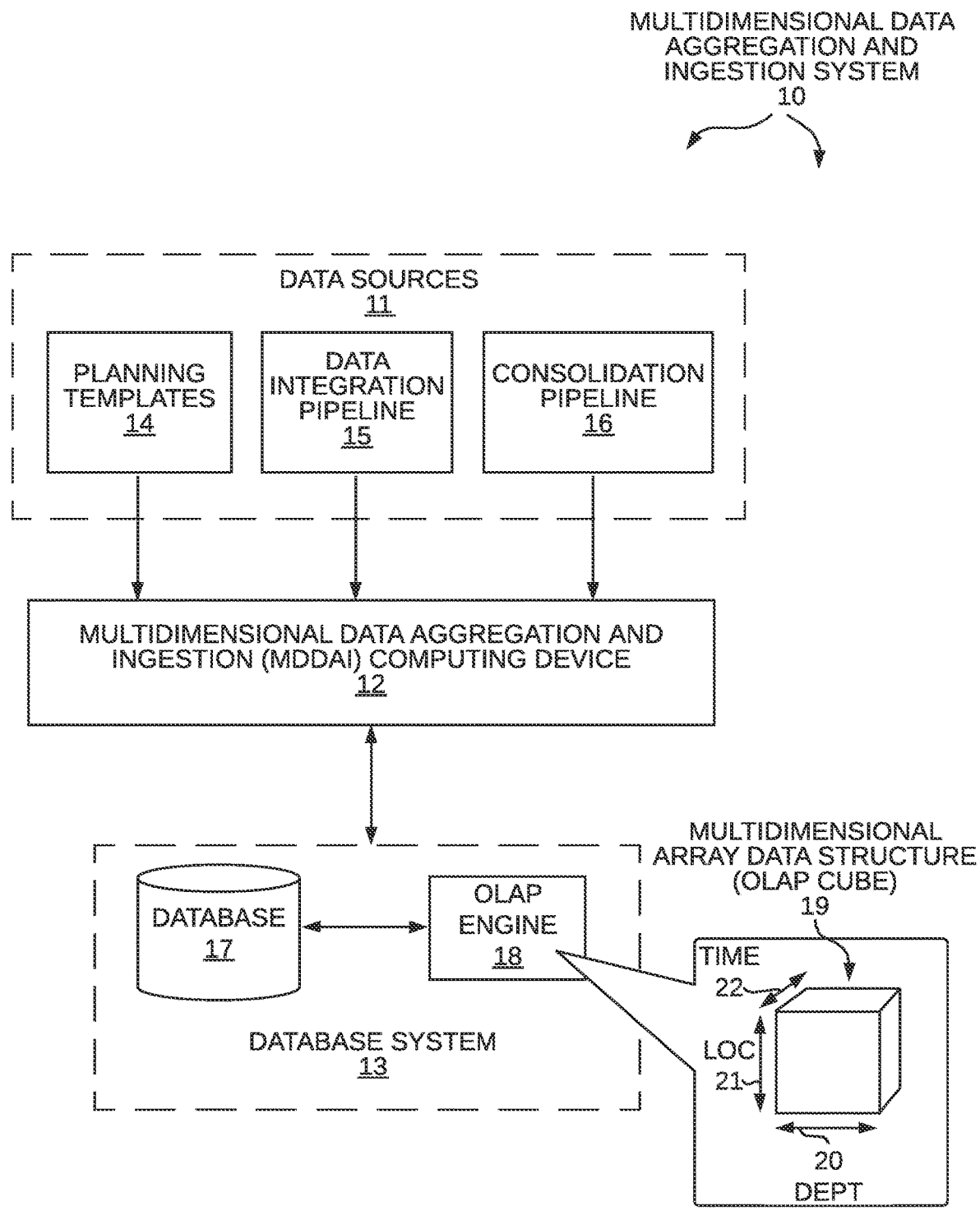
FIG. 1 is a diagram of a multidimensional data aggregation and ingestion system 10 in accordance with one embodiment.

FIG. 1 is a diagram of a multidimensional data aggregation and ingestion system 10 in accordance with one embodiment. The multidimensional data aggregation and ingestion system 10 comprises one or more data sources 11, a multidimensional data aggregation and ingestion computing device 12, and a database system 13. The data sources 11 include any generating source or stored source of time-series data including internal and external data sources. In this embodiment, the data sources 11 include planning templates 14, data integration pipeline 15, and consolidation pipeline 16. In one embodiment, planning templates 14 are spreadsheets prepared manually by one or more parties, data integration pipeline 15 pulls data from one or more third party data sources (such as Enterprise Resource Planning (ERP) systems), and consolidation pipeline 16 operates to consolidate data from multiple internal and/or external data sources.

The database system 13 comprises a database 17 and a multidimensional data representation engine 18. Database 17 is any suitable database for storing multidimensional data, including relational database management systems (RDBMS), document-oriented databases, and other data storage systems. In the embodiment shown in FIG. 1, the database system 13 is an SQL Server Analysis Services (SSAS) database, the database 17 is an RDBMS, and the multidimensional data representation engine 18 is an Online Analytical Processing (OLAP) engine 18. It is appreciated that novel delta calculations disclosed herein are applicable to other database architectures that store multidimensional data.

Information stored in database system 13 is used to generate one or more multidimensional array data structures that represent multidimensional time series data. Multidimensional time series data includes financial data, such as general ledger data across an organization having various departments over various geographic locations. One example of a multidimensional array data structure is an online analytical processing (OLAP) cube 19. OLAP cube 19 optionally implements any multidimensional OLAP (MOLAP), relational OLAP (ROLAP), and hybrid OLAP (HOLAP) architecture. OLAP cube 19 is used to represent multidimensional data, such as general ledger data. In one embodiment, OLAP cube 19 presents financial data across various departments and locations over various time periods. In this embodiment, department information is presented along a first axis 20, location information is presented along a second axis 21, and time information is represented along a third axis 22. Due to the multidimensional nature of OLAP cube 19, significant computational resources are involved in generating OLAP cube 19.

In accordance with at least one novel aspect, computing system 10 performs delta calculations to ingest large quantities of new ledger data across multiple dimensions. Delta values are appended to OLAP cube 19. In the case of SSAS, SSAS includes a processing method "Process Add" that is usable to append calculated delta values to the OLAP cube 19. Appending data values to the OLAP cube 19 updates the OLAP cube 19 with newly ingested ledger data without requiring OLAP cube 19 to be deleted and newly generated with each ingestion of new time series data.

Figure 2:
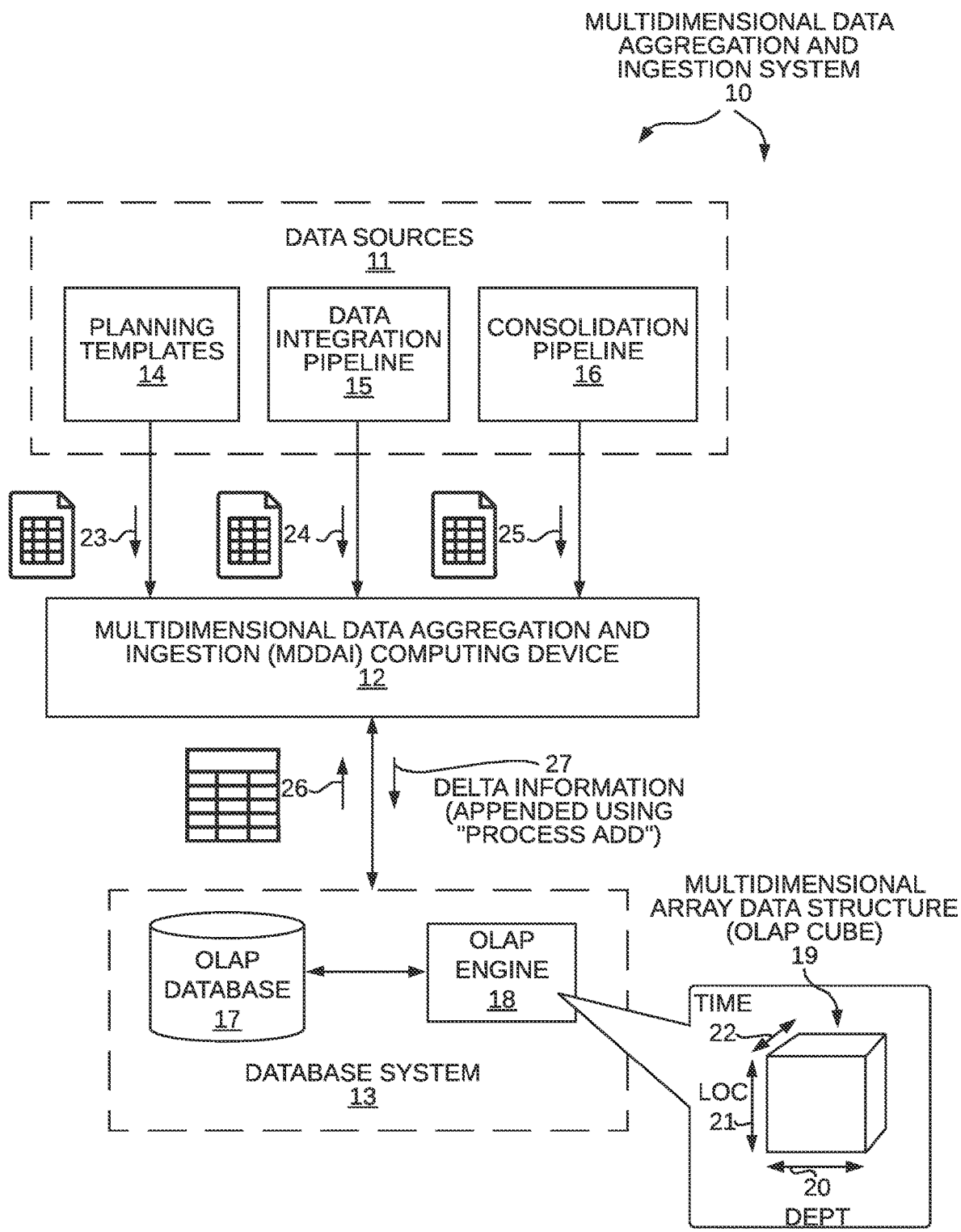
FIG. 2 is a diagram showing data flow during a data ingestion process of multidimensional data aggregation and ingestion system 10.

FIG. 2 is a diagram showing data flow during a data ingestion process of multidimensional data aggregation and ingestion system 10. In operation, data from one or more data sources 11 is ingested into the multidimensional data aggregation and ingestion computing device 12. Planning templates data source 14 supplies data 23 to the multidimensional data aggregation and ingestion computing device 12. Data integration pipeline data source 15 supplies data 24 to the multidimensional data aggregation and ingestion computing device 12. Consolidation pipeline data source 16 supplies data 25 to the multidimensional data aggregation and ingestion computing device 12. The multidimensional data aggregation and ingestion computing device 12 retrieves stored data 26 from database system 13. The database 17 stores multidimensional data in a tabular, relational database format in accordance with this embodiment.

The multidimensional data aggregation and ingestion computing device 12 performs delta calculations by comparing the stored data 26 to received data 23, 24, and 25. Received data 23, 24, and 25 and stored data 26 are communicated in a tabular, plain-text format, such as a comma-separated values (CSV) file. Received data 23, 24, and 25 and stored data 26 include financial data across many accounts and over various time periods. For example, received data 23, 24, and 25 and stored data 26 include month-to-date (MTD) account balances over a twelve-month (12-month) period or over a sixty-month (60-month) period.

After the multidimensional data aggregation and ingestion computing device 12 performs delta calculations, delta information 27 is communicated to the database system 13. In this embodiment, the multidimensional data aggregation and ingestion computing device 12 sends the delta information 27 to database system 13 using the SSAS "Process Add" processing method. The delta information 27 is added to the OLAP cube 19 without having to re-create the OLAP cube 19. Data is ingested in the ingestion process without having to delete the existing OLAP cube 19 and create a new one.

Figure 3:
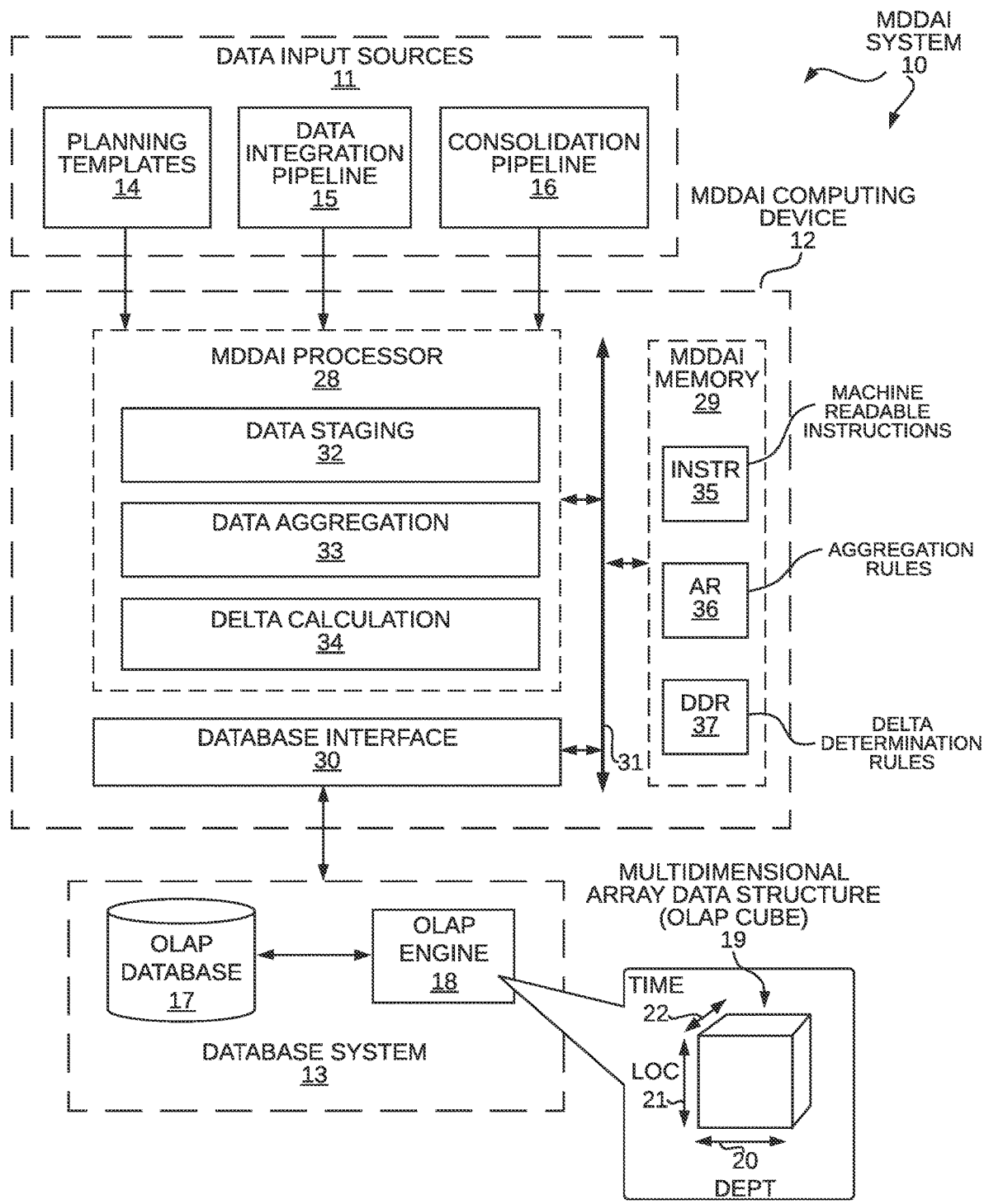
FIG. 3 is a detailed diagram of the multidimensional data aggregation and ingestion computing device 12 in accordance with one embodiment.

FIG. 3 is a detailed diagram of the multidimensional data aggregation and ingestion computing device 12 in accordance with one embodiment. The multidimensional data aggregation and ingestion computing device 12 comprises a multidimensional data aggregation and ingestion (MDDAI) processor 28, multidimensional data aggregation and ingestion memory 29, database interface 30, and communication link 31. The multidimensional data aggregation and ingestion processor 28 includes a data staging process 32, a data aggregation process 33, and a delta calculation process 34. The multidimensional data aggregation and ingestion memory 29 stores machine readable instructions 35, aggregation rules 36, and delta determination rules 37.

The multidimensional data aggregation and ingestion processor 28, the multidimensional data aggregation and ingestion memory 29, and database interface 30 communicate over the communication link 31. In one embodiment, the multidimensional data aggregation and ingestion processor 28, the multidimensional data aggregation and ingestion memory 29, and the database interface 30 are integrated into a single device. In another embodiment, the multidimensional data aggregation and ingestion processor 28, the multidimensional data aggregation and ingestion memory 29, and the database interface 30 are distributed components that operate over a network.

The aggregation rules 36 are configurable and indicate how received data 23-25 is to be aggregated together from one or more data sources 11. The delta determination rules 37 are configurable and indicate how received data 23-25 (as shown in FIG. 2) is to be compared to stored data 26 in database system 13 to generate the delta information 27. The instructions 35 are executed by the multidimensional data aggregation and ingestion processor 28 causing data 23-25 to be received from data sources 11, optionally staged, aggregated in accordance with aggregation rules 36, and compared to data 26 stored in database system 13 thereby obtaining delta information 27, and causing delta information 27 to be appended to OLAP cube 19. The OLAP cube 19 is updated in database system 13 without generating a new multidimensional array data structure in database system 13.

The multidimensional data aggregation and ingestion processor 28 is a special purpose processor configured to process commercially significant quantities of multidimensional data. The multidimensional data aggregation and ingestion memory 29 is a special purpose storage configured to store commercially significant quantities of multidimensional data. The multidimensional data aggregation and ingestion processor 28 and multidimensional data aggregation and ingestion memory 29 include one or more of a programmable microcontroller, an Application Specific Integrated Circuit (ASIC), a programmable logic array (PLA), a Field Programmable Gate Array (FPGA), a processor that executes instructions, an amount of discrete digital logic components, or a specially configured cloud function or service that operates and communicates over a network.

Figure 4:
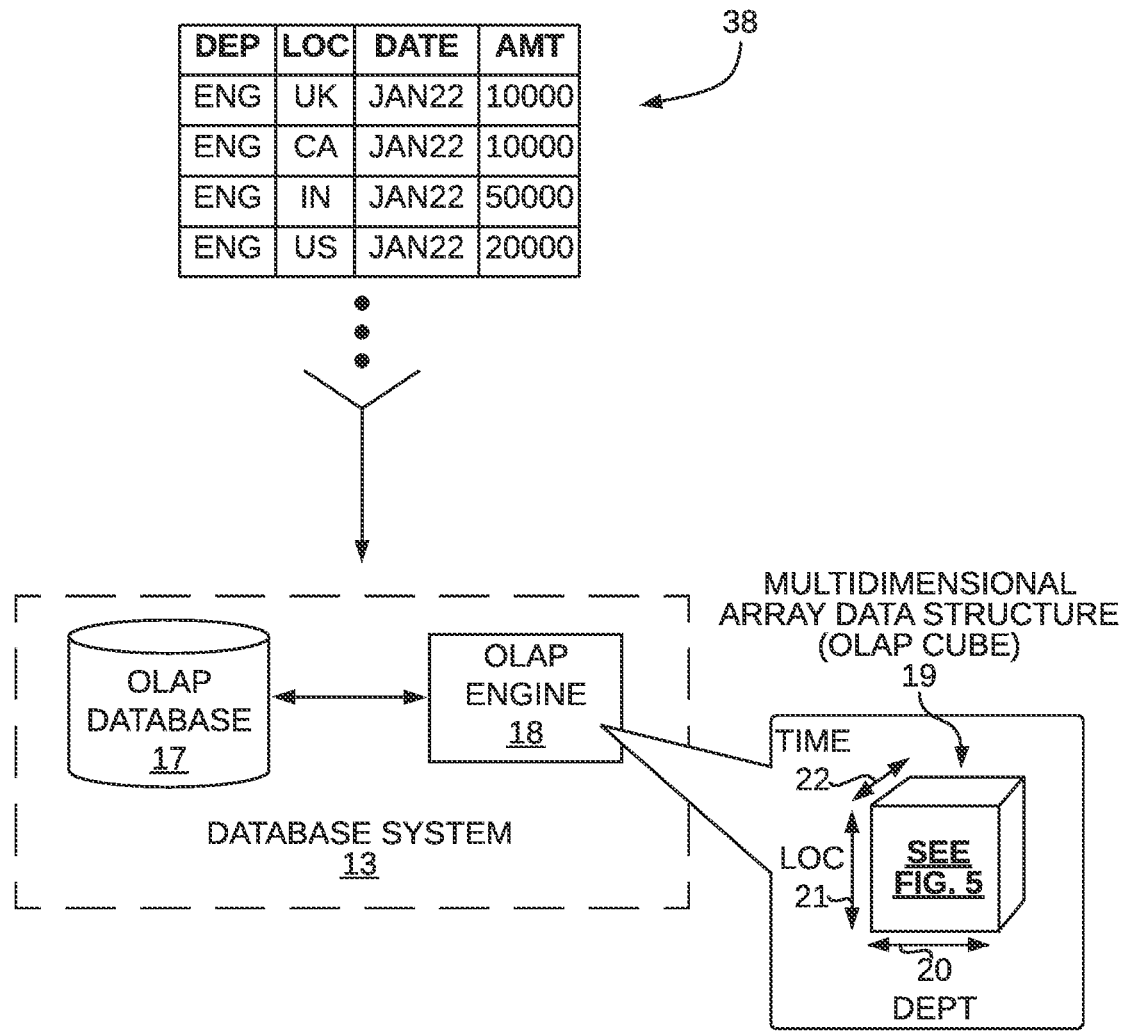
FIG. 4 is a diagram showing how initial data 38 is used to generate the OLAP cube 19.

FIG. 4 is a diagram showing how initial data 38 is used to generate the OLAP cube 19. Initial data 38 is received onto the database system 13. The database system 13 uses the initial data 38 to generate the OLAP cube 19. In this example, the initial data 38 includes account balance information for a department ("Engineering") across various locations ("United Kingdom", "Canada", "India", and "United States") for a time period ("January 2022"). In this example, the time axis 22 stores aggregate account balances for each quarter.

Figure 5:
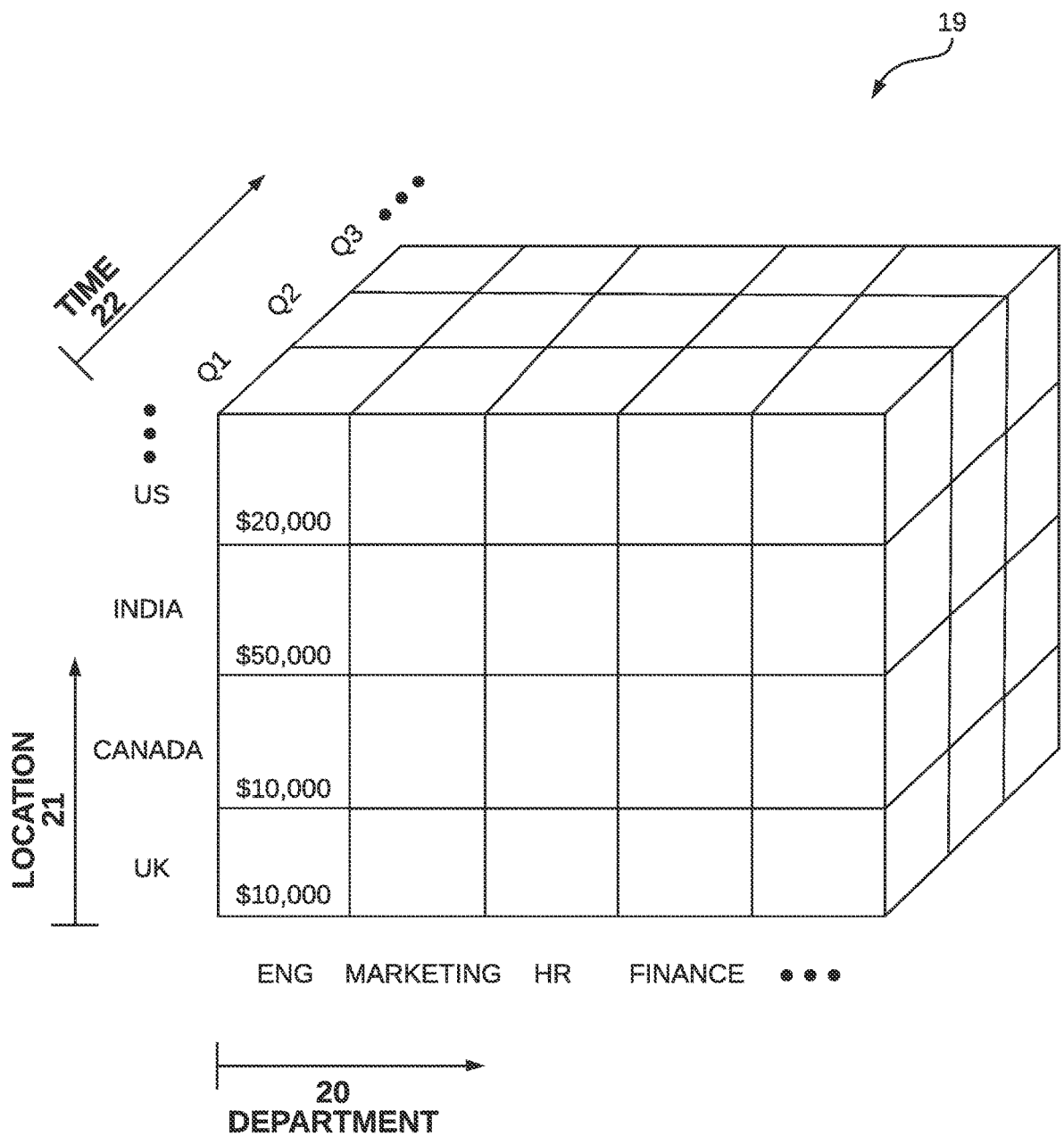
FIG. 5 is a detailed diagram of OLAP cube 19 after being generated from initialization data.

FIG. 5 is a detailed diagram of OLAP cube 19 after being generated from initialization data. The OLAP cube 19 stores account balance information in the multidimensional cube structure. In this example, the "Engineering" department's "United Kingdom" location has a "first quarter of 2022" account balance of "$10,000", the "Engineering" department's "Canada" location has a "first quarter of 2022" account balance of "$10,000", the "Engineering" department's "India" location has a "first quarter of 2022" account balance of "$50,000", and the "Engineering" department's "United States" location has a "first quarter of 2022" account balance of "$20,000".

Figure 6:
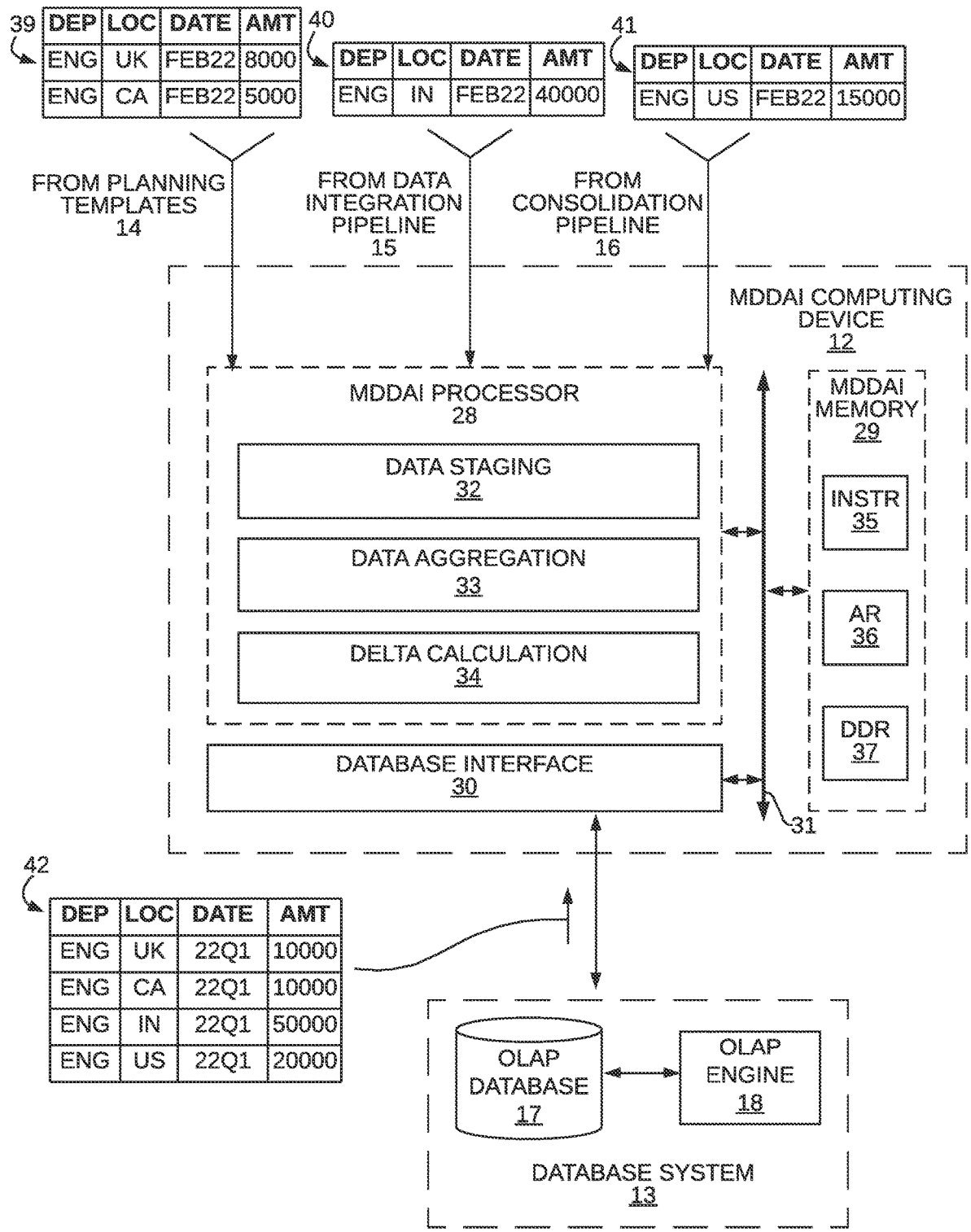
FIG. 6 is a diagram showing how data is received onto the multidimensional data aggregation and ingestion computing device 12 during a first ingestion operation.

FIG. 6 is a diagram showing how data is received onto the multidimensional data aggregation and ingestion computing device 12 during a first ingestion operation. In this example, the first ingestion operation ingests account information for the "February 2022" time period. Planning templates 14 supply data 39 to the multidimensional data aggregation and ingestion computing device 12. Data integration pipeline 15 supplies data 40 to the multidimensional data aggregation and ingestion computing device 12. Consolidation pipeline 16 supplies data 41 to the multidimensional data aggregation and ingestion computing device 12.

In this example, data 39 received from planning templates 14 includes an account balance of "$8,000" for the "United Kingdom" location of the "Engineering" department for "February 2022" and an account balance of "$5,000" for the "Canada" location of the "Engineering" department for "February 2022". Data 40 received from data integration pipeline 15 includes an account balance of "$40,000" for the "India" location of the "Engineering" department for "February 2022". Data 41 received from consolidation pipeline 16 includes an account balance of "$15,000" for the "United States" location of the "Engineering" department for "February 2022". The multidimensional data aggregation and ingestion computing device 12 retrieves data 42 stored in the database system 13 for the "first quarter of 2022" time period. Data 42 is a tabular representation of data stored in OLAP cube 19 shown in FIG. 5.

Figure 7:
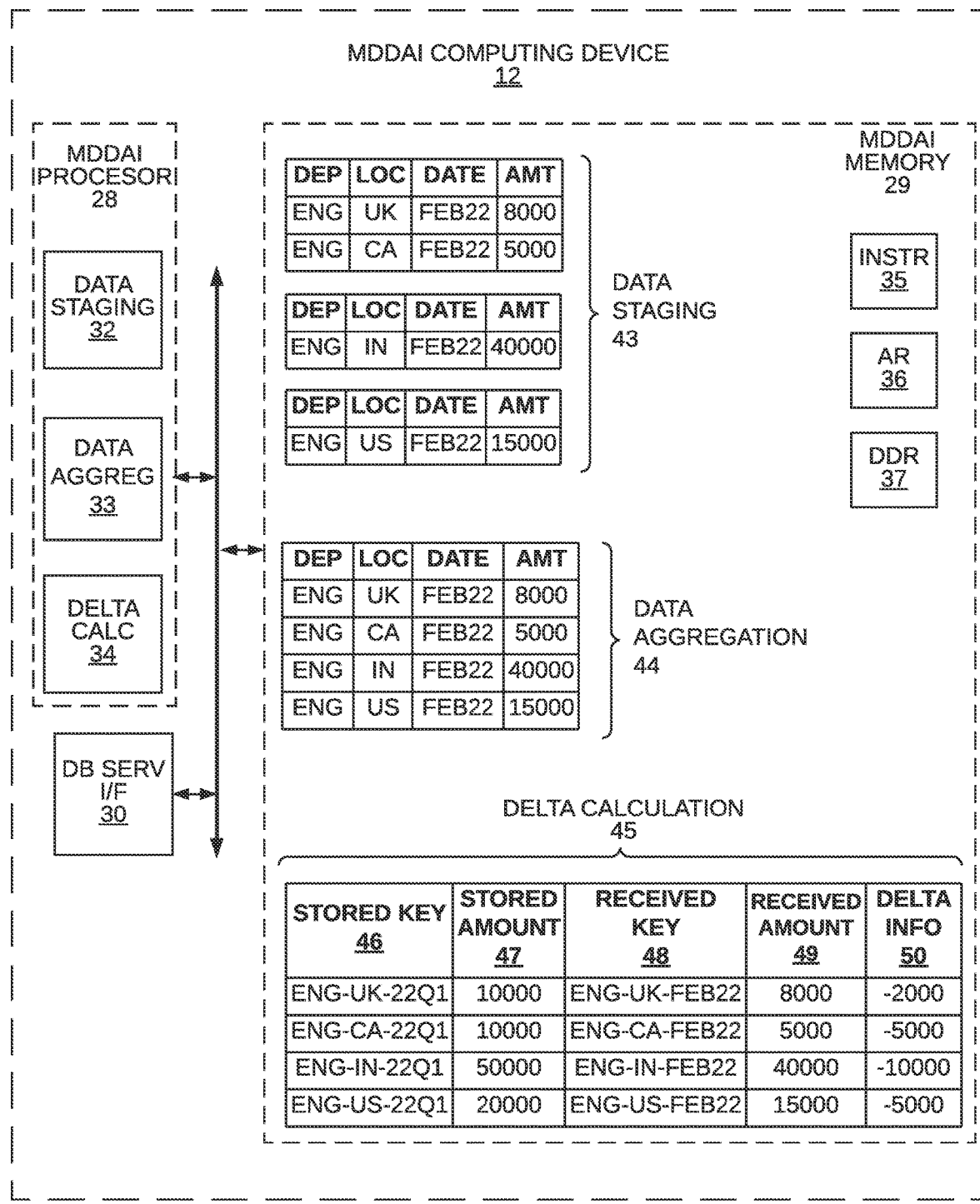
FIG. 7 is a diagram showing how the multidimensional data aggregation and ingestion computing device 12 performs staging, aggregation, and delta calculation during the first ingestion process.

FIG. 7 is a diagram showing how the multidimensional data aggregation and ingestion computing device 12 performs staging, aggregation, and delta calculation during the first ingestion process. First, the multidimensional data aggregation and ingestion processor 28 stores received data 39, 40, and 41 (as shown in FIG. 6) in the multidimensional data aggregation and ingestion memory 29 in the data staging process 32. Reference numeral 43 identifies how received data 39, 40, and 41 is temporarily stored in the multidimensional data aggregation and ingestion memory 29. The data staging process 32 presents a seamless user experience in which the ingestion process is hidden and not visibly apparent to a user. The data staging process 32 makes it appear to a user as if data ingestion occurs instantaneously.

Next, the multidimensional data aggregation and ingestion processor 28 aggregates received data 39, 40, and 41 in the multidimensional data aggregation and ingestion memory 29 in the data aggregation process 33. In the data aggregation process 33, received data 39, 40, and 41 is aggregated in accordance with aggregation rules 36. Received data 39, 40, and 41 is aggregated in the multidimensional data aggregation and ingestion memory 29 in structure 44.

Next, the multidimensional data aggregation and ingestion processor 28 determines delta information by comparing received data 39, 40, and 41 to corresponding stored data in the database system 13 in the delta calculation process 34. In the delta calculation process 34, received data 39, 40, and 41 is compared to stored data 42 (as shown in FIG. 6) in accordance with delta determination rules 37. Structure 45 includes a stored key column 46, a stored amount column 47, received key column 48, a received amount column 49, and delta information 50.

In this example, delta values are determined by subtracting stored account balance information for "first quarter 2022" time period from received account balance information for the "February 2022" time period. Delta information for stored key "ENG-UK-2201" is determined by subtracting the stored account balance amount of "$10,000" for "first quarter of 2022" from the received key "ENG-UK-FEB22" account balance of "$8,000" for "February 2022", thereby yielding a delta value of "−$2,000". Delta information for stored key "ENG-CA-2201" is determined by subtracting the stored account balance amount of "$10,000" for "first quarter of 2022" from the received key "ENG-CA-FEB22" account balance of "$5,000" for "February 2022", thereby yielding a delta value of "−$5,000". Delta information for stored key "ENG-IN-2201" is determined by subtracting the stored account balance amount of "$50,000" for "first quarter of 2022" from the received key "ENG-IN-FEB22" account balance of "$40,000" for "February 2022", thereby yielding a delta value of "−$10,000". Delta information for stored key "ENG-US-22Q1" is determined by subtracting the stored account balance amount of "$20,000" for "first quarter of 2022" from the received key "ENG-US-FEB22" account balance of "$15,000" for "February 2022", thereby yielding a delta value of "−$5,000".

Figure 8:
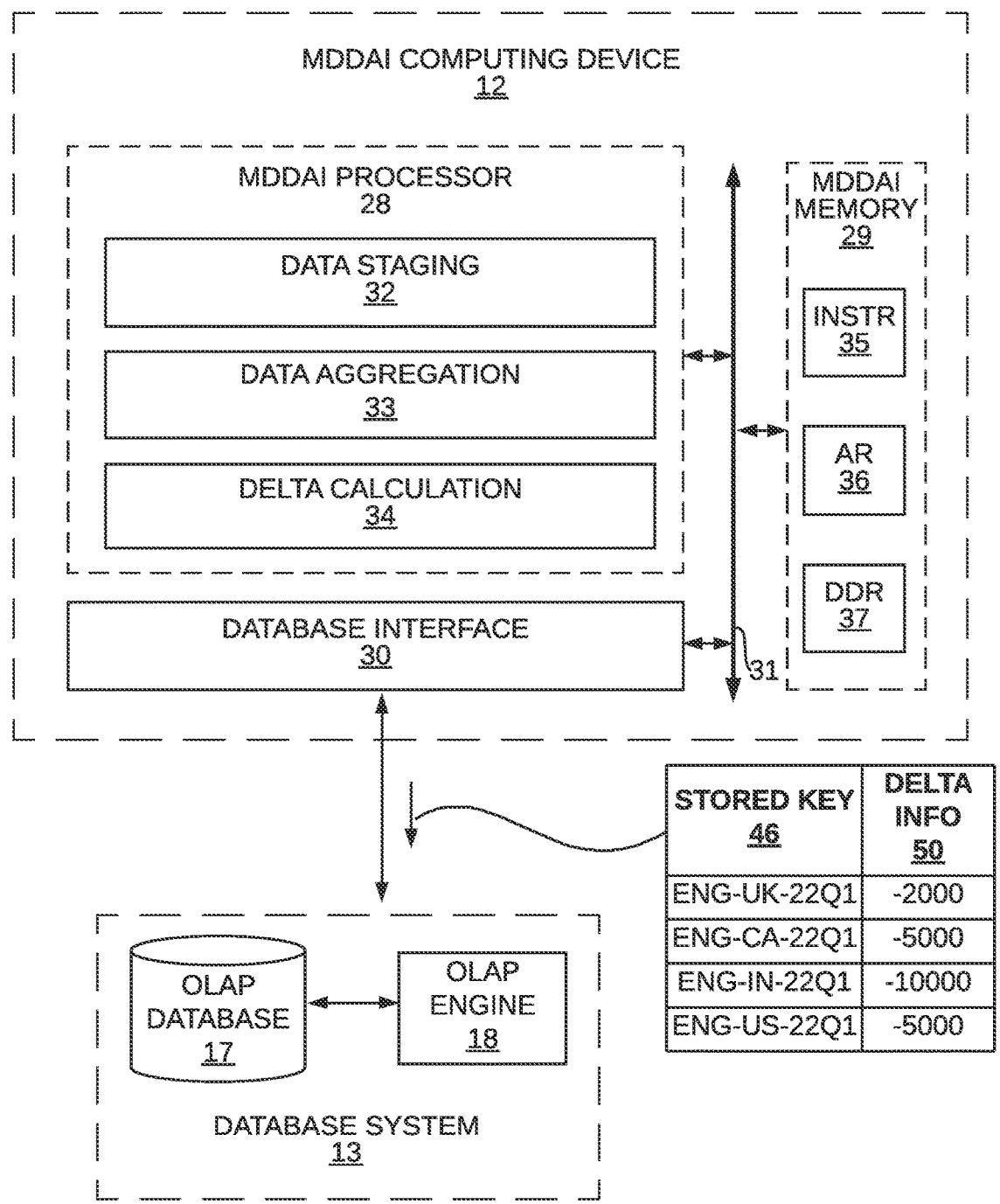
FIG. 8 is a diagram showing how delta information determined in the first ingestion process is appended to the OLAP cube 19 in database system 13.

FIG. 8 is a diagram showing how delta information determined in the first ingestion process is appended to the OLAP cube 19 in database system 13. Database interface 30 communicates the delta values 50 for corresponding stored keys 46 to the database system 13. In this embodiment, the database interface 30 uses SSAS processing method "Process Add" to append calculated delta values to the OLAP cube 19. The OLAP cube 19 is updated with newly ingested data without generating a new OLAP cube.

Figure 9:
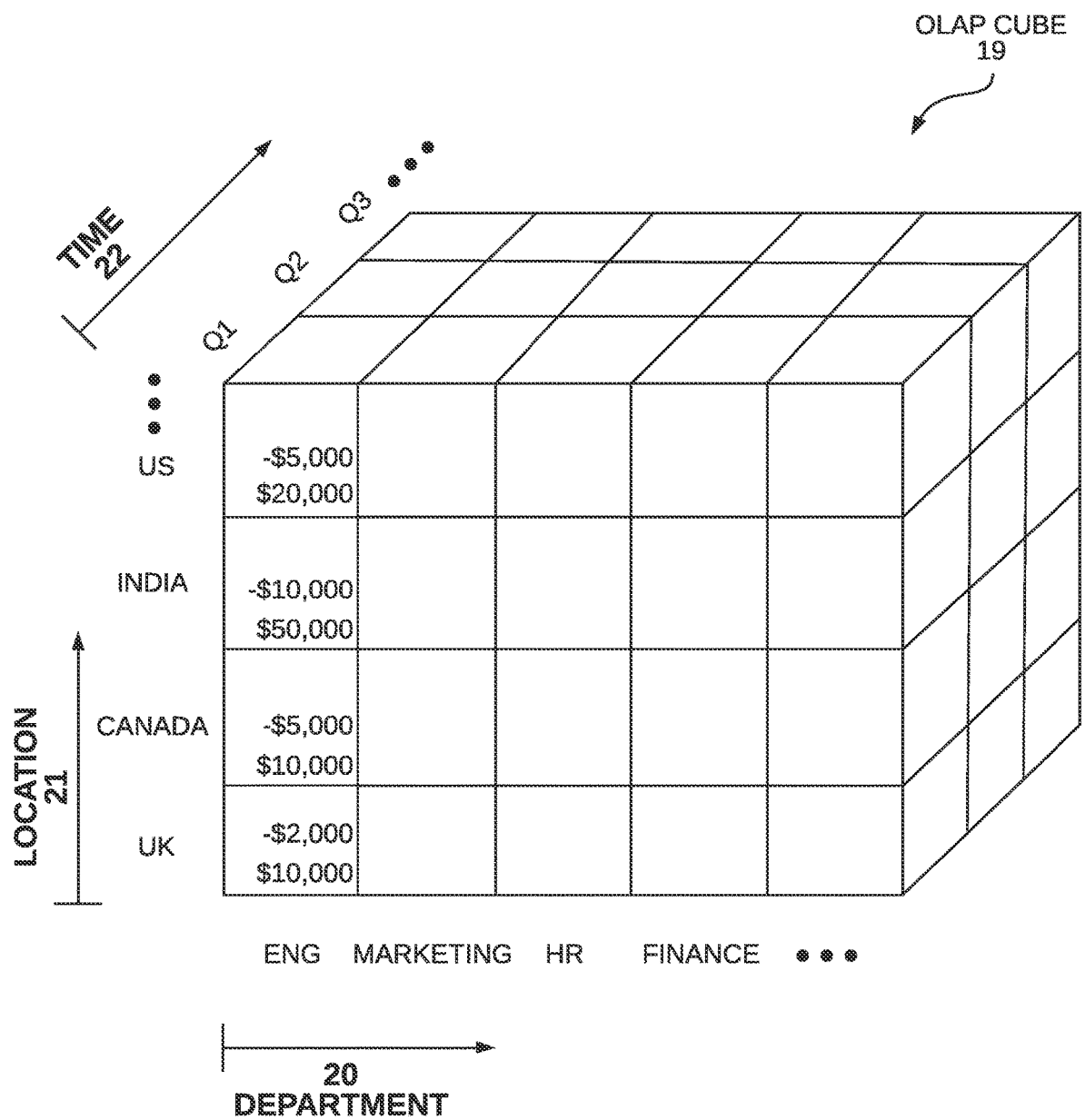
FIG. 9 is a diagram showing the OLAP cube 19 with appended delta information determined during the first ingestion process.

FIG. 9 is a diagram showing the OLAP cube 19 with appended delta information determined during the first ingestion process. In this example, summation of values in each quadrant yields account balance information for a particular key of the OLAP cube 19. For example, the account balance of the "Engineering" department in the "United Kingdom" for the "first quarter of 2022" is "$8,000" (computed as follows: −$2,000+$10,000=$8,000).

Figure 10:
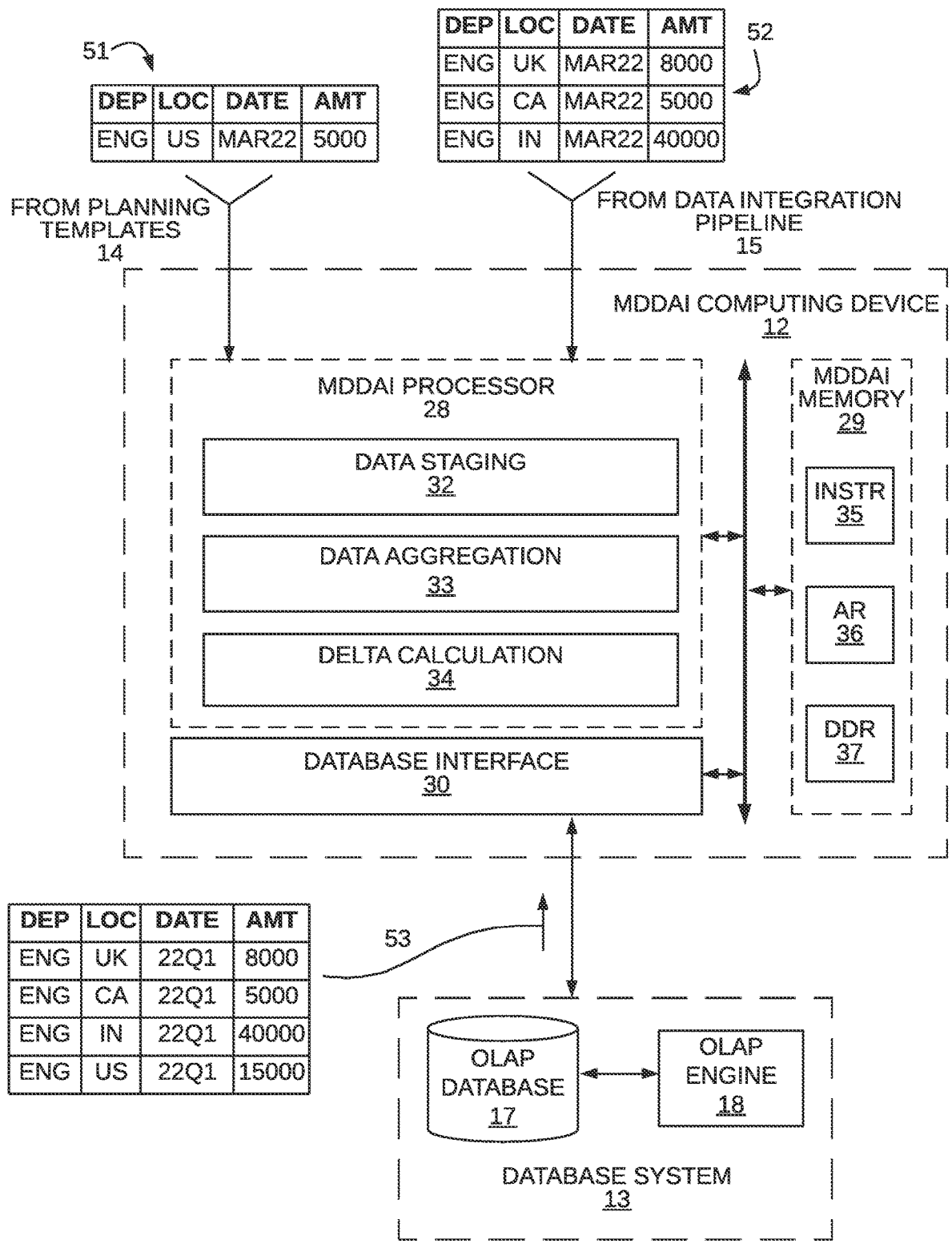
FIG. 10 is a diagram showing how data is received onto the multidimensional data aggregation and ingestion computing device 12 during a second ingestion operation.

FIG. 10 is a diagram showing how data is received onto the multidimensional data aggregation and ingestion computing device 12 during a second ingestion operation. In this example, the second ingestion operation ingests account information for the "March 2022" time period. Planning templates 14 supply data 51 to the multidimensional data aggregation and ingestion computing device 12. Data integration pipeline 15 supplies data 42 to the multidimensional data aggregation and ingestion computing device 12. No data is supplied by the consolidation pipeline 16 in the second ingestion operation.

In this example, data 51 received from planning templates 14 includes an account balance of "$5,000" for the "United States" location of the "Engineering" department for "March 2022". Data 52 received from data integration pipeline 15 includes an account balance of "$8,000" for the "United Kingdom" location of the "Engineering" department for "March 2022", an account balance of "$5,000" for the "Canada" location of the "Engineering" department for "March 2022", and an account balance of "$40,000" for the "India" location of the "Engineering" department for "March 2022". The multidimensional data aggregation and ingestion computing device 12 retrieves data 53 stored in the database system 13 for the "first quarter of 2022" time period. Data 53 is a tabular representation of data stored in OLAP cube 19 shown in FIG. 9. The amounts shown in table 53 correspond to aggregated values for each key of the OLAP cube 19.

Figure 11:
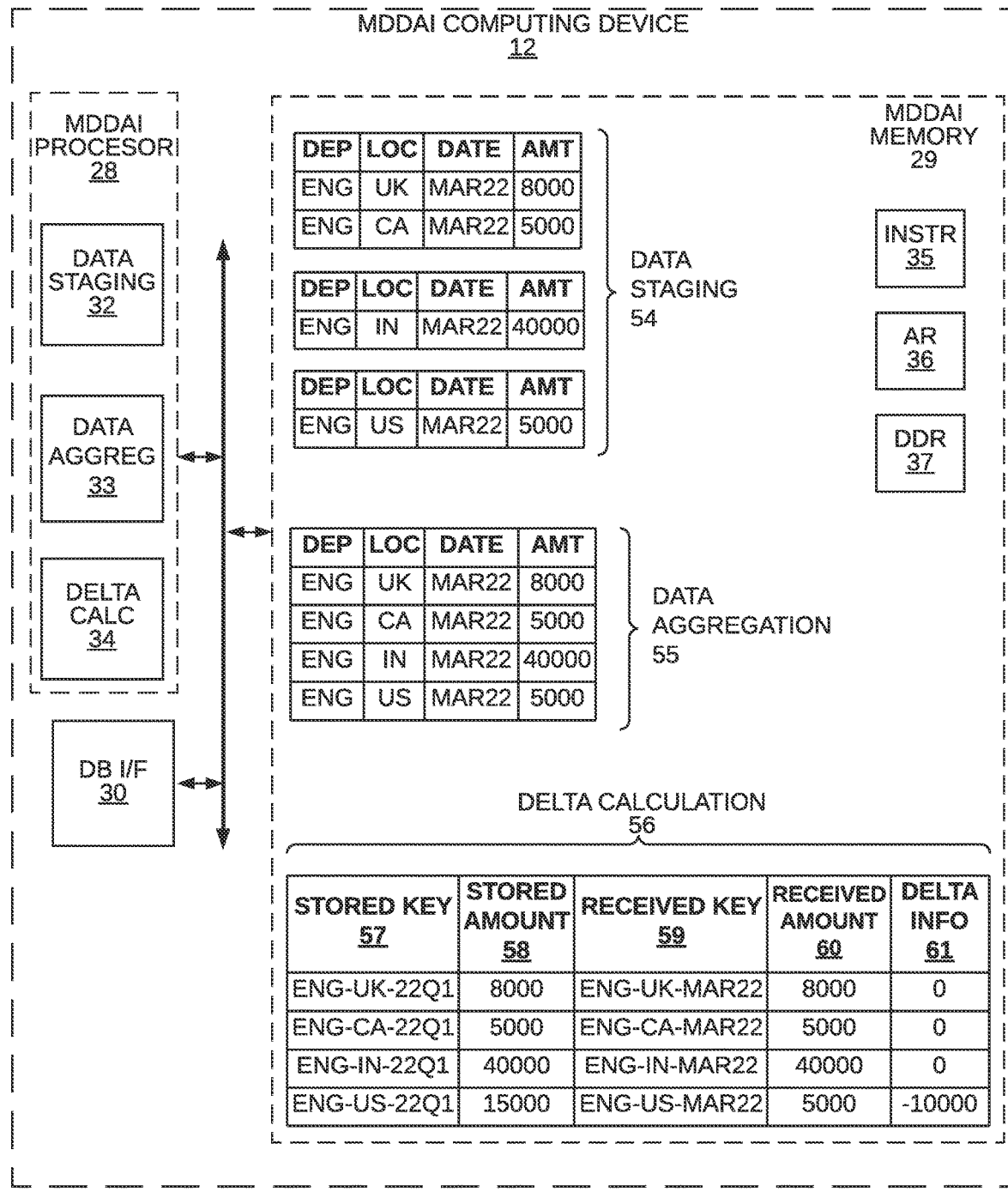
FIG. 11 is a diagram showing how the multidimensional data aggregation and ingestion computing device 12 performs staging, aggregation, and delta calculation during the second ingestion process.

FIG. 11 is a diagram showing how the multidimensional data aggregation and ingestion computing device 12 performs staging, aggregation, and delta calculation during the second ingestion process. First, the multidimensional data aggregation and ingestion processor 28 stores received data 51 and 52 (as shown in FIG. 10) in the multidimensional data aggregation and ingestion memory 29 in the data staging process 32. Reference numeral 54 identifies how received data 51 and 52 is temporarily stored in the multidimensional data aggregation and ingestion memory 29. The data staging process 32 presents a seamless user experience in which the ingestion process is hidden and not visibly apparent to a user. The data staging process 32 makes it appear to a user as if data ingestion occurs instantaneously.

Next, the multidimensional data aggregation and ingestion processor 28 aggregates received data 51 and 52 in the multidimensional data aggregation and ingestion memory 29 in the data aggregation process 33. In the data aggregation process 33, received data 51 and 52 is aggregated in accordance with aggregation rules 36. Received data 51 and 52 is aggregated in the multidimensional data aggregation and ingestion memory 29 in structure 55.

Next, the multidimensional data aggregation and ingestion processor 28 determines delta information by comparing received data 51 and 52 to corresponding stored data in the database system 13 in the delta calculation process 34. In the delta calculation process 34, received data 51 and 52 is compared to stored data 53 in accordance with delta determination rules 37. Structure 56 includes a stored key column 57, stored amount column 58, received key column 59, received amount column 60, and delta information 61.

In this example, delta values are determined by subtracting stored account balance information for "first quarter 2022" time period from received account balance information for the "March 2022" time period. Delta information for stored key "ENG-UK-2201" is determined by subtracting the stored account balance amount of "$8,000" for "first quarter of 2022" from the received key "ENG-UK-MAR22" account balance of "$8,000" for "March 2022", thereby yielding a delta value of "$0". Delta information for stored key "ENG-CA-2201" is determined by subtracting the stored account balance amount of "$5,000" for "first quarter of 2022" from the received key "ENG-CA-MAR22" account balance of "$5,000" for "March 2022", thereby yielding a delta value of "$0". Delta information for stored key "ENG-IN-22Q1" is determined by subtracting the stored account balance amount of "$40,000" for "first quarter of 2022" from the received key "ENG-IN-MAR22" account balance of "$40,000" for "March 2022", thereby yielding a delta value of "$0". Delta information for stored key "ENG-US-2201" is determined by subtracting the stored account balance amount of "$15,000" for "first quarter of 2022" from the received key "ENG-US-MAR22" account balance of "$5,000" for "March 2022", thereby yielding a delta value of "-$10,000". Only stored information for key "ENG-US-2201" is updated based on the second ingestion process.

Figure 12:
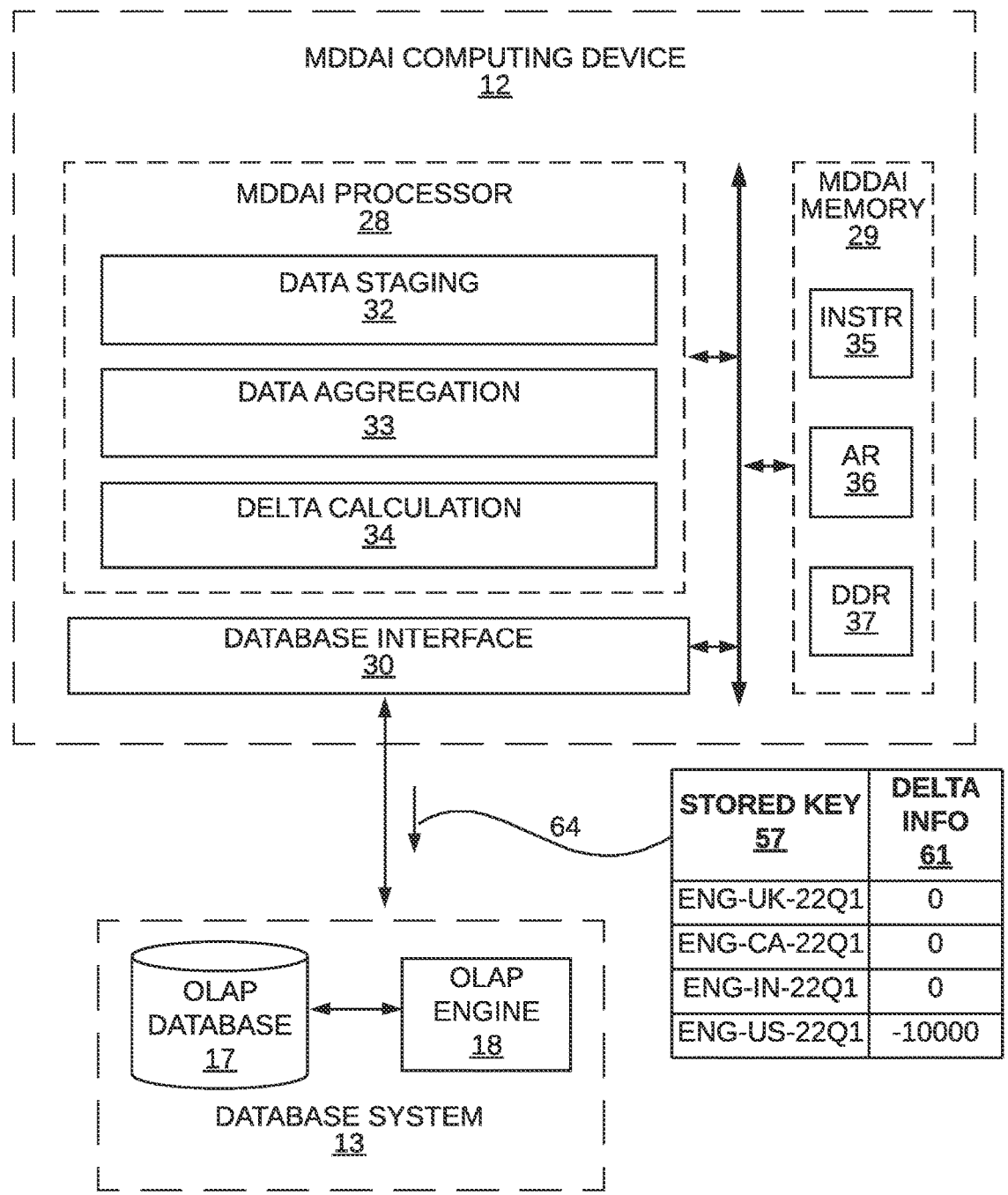
FIG. 12 is a diagram showing how delta information determined in the second ingestion process is appended to the OLAP cube 19 in database system 13.

FIG. 12 is a diagram showing how delta information determined in the second ingestion process is appended to the OLAP cube 19 in database system 13. Database interface 30 communicates the delta values 61 for corresponding stored keys 57 to the database system 13. In this embodiment, the database interface 30 uses SSAS processing method "Process Add" to append calculated delta values to the OLAP cube 19. The OLAP cube 19 is updated with newly ingested data without generating a new OLAP cube. The "ENG-US-2201" key value is the only portion of OLAP cube 19 that is updated.

Figure 13:
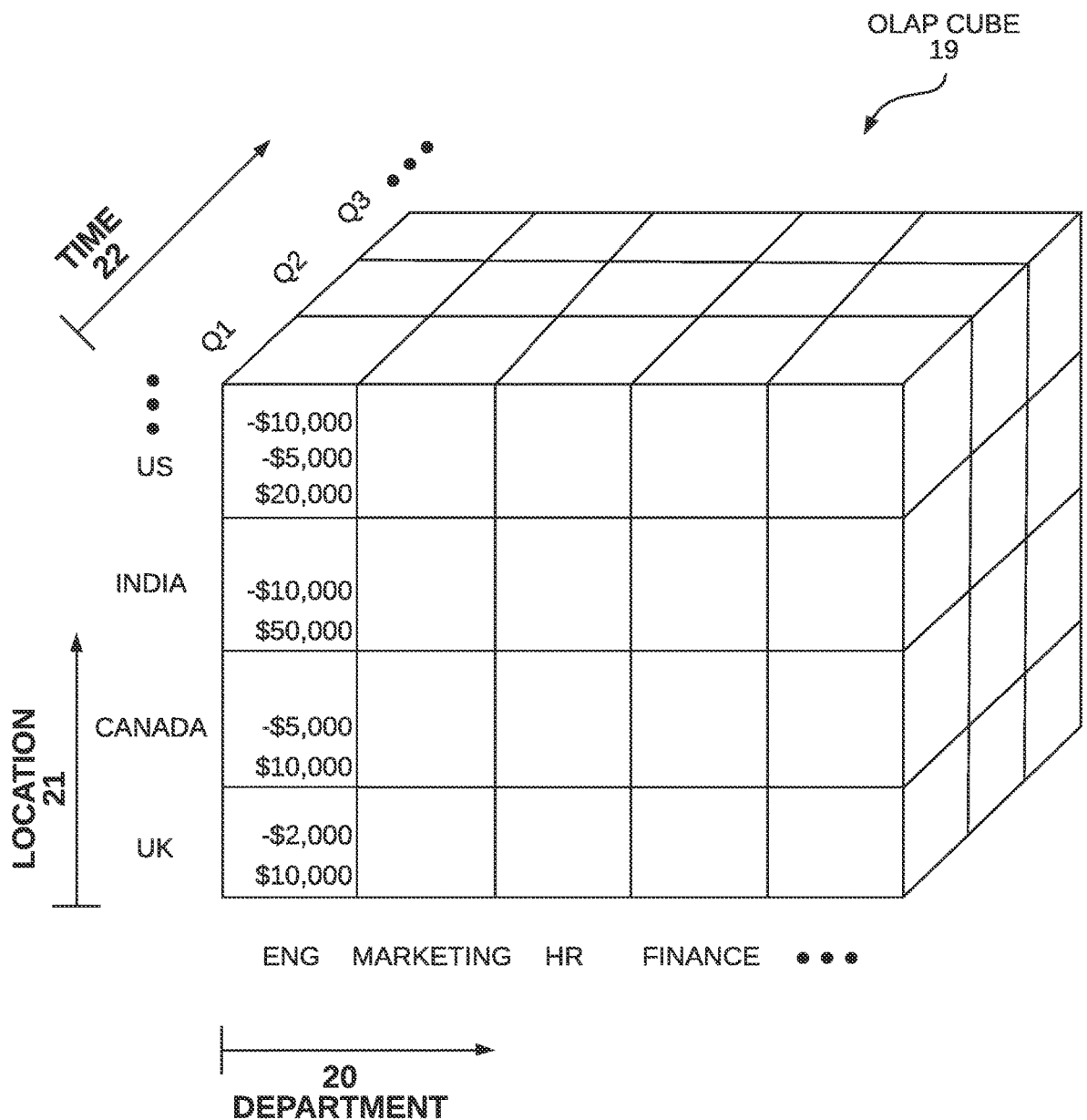
FIG. 13 is a diagram showing the OLAP cube 19 with appended delta information determined during the second ingestion process.

FIG. 13 is a diagram showing the OLAP cube 19 with appended delta information determined during the second ingestion process. In this example, summation of values in each quadrant yields account balance information for a particular key of the OLAP cube 19. For example, the updated account balance of the "Engineering" department in the "United States" for the "first quarter of 2022" is "$5,000" (−$10,000+−$5,000+$20,000=$5,000).

Figure 14:
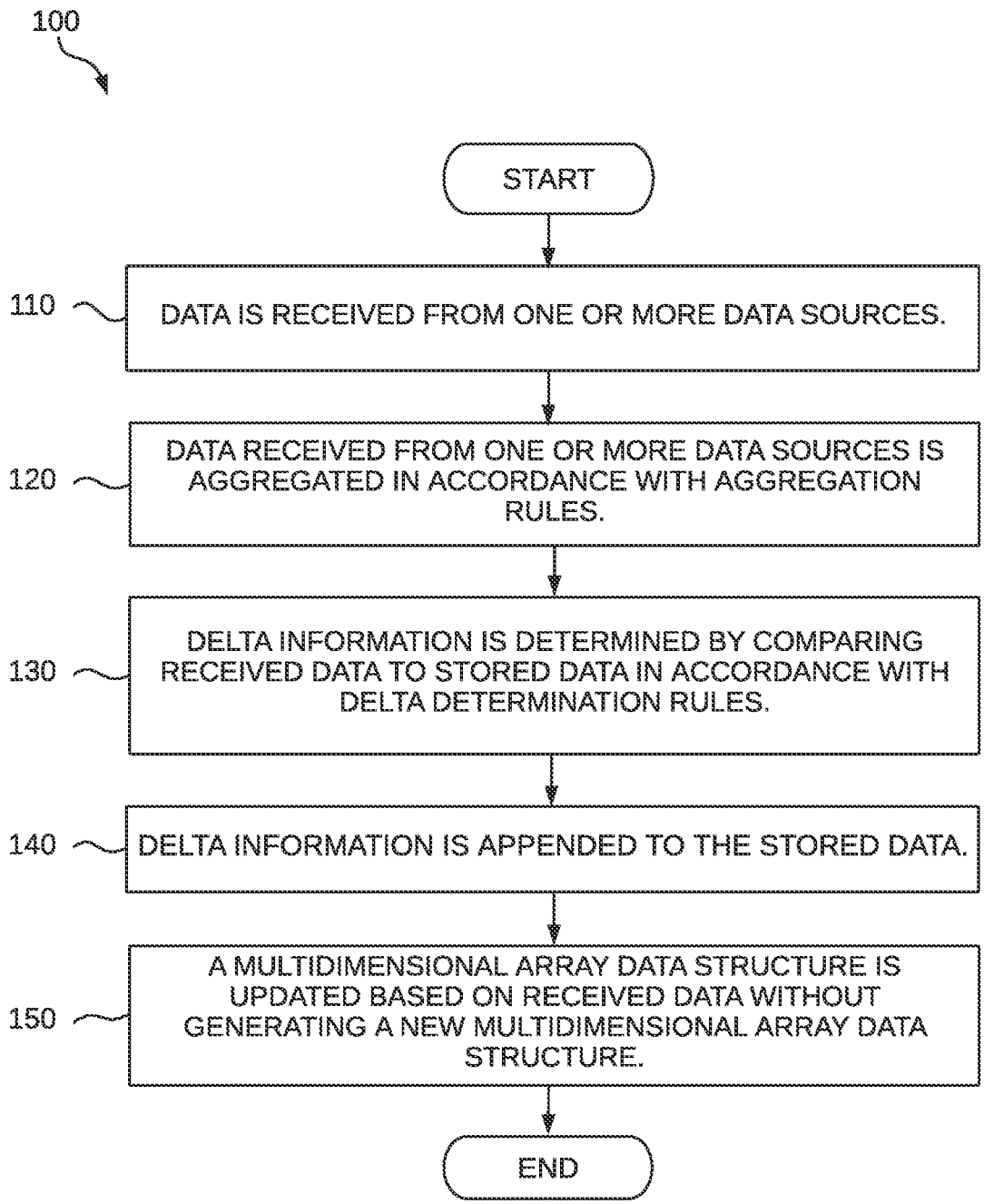
FIG. 14 is a diagram of a method 100 in accordance with one novel aspect.

FIG. 14 is a diagram of a method 100 in accordance with one novel aspect. In a first step (step 110), data is received from one or more data sources. Data is any time-series data or aggregated data over one or more time periods. Data sources are internal or external data sources. In the example of FIG. 2, planning template data source 14 supplies data 23 to the multidimensional data aggregation and ingestion computing device 12, the data integration pipeline data source 15 supplies data 24 to the multidimensional data aggregation and ingestion computing device 12, and the consolidation pipeline data source 16 supplies data 25 to the multidimensional data aggregation and ingestion computing device 12.

In a second step (step 120), data received from one or more data sources is aggregated in accordance with aggregation rules. In the example of FIG. 7, structure 44 stores aggregated values of all received data 39, 40, and 41. Aggregation rules 36 are stored in the multidimensional data aggregation and ingestion memory 29.

In a third step (step 130), delta information is determined by comparing received data to stored data in accordance with delta determination rules. In the first ingestion operation example of FIG. 7, delta information 50 is determined by comparing received data 39, 40, and 41 to stored data 42. For the "ENG-UK-22Q1" key, the delta calculation is as follows: $8,000−$10,000=−$2,000. For the "ENG-CA-2201" key, the delta calculation is as follows: $5,000−$10,000=−$5,000. For the "ENG-IN-22Q1" key, the delta calculation is as follows: $40,000−$50,000=−$10,000. For the "ENG-US-2201" key, the delta calculation is as follows: $15,000−$20,000=−$5,000.

In a fourth step (step 140), the delta information is appended to the stored data. In the first ingestion operation example shown in FIG. 8, the database interface 30 appends delta information 50 to the OLAP cube 19 using the SSAS "Process Add" processing method.

In a fifth step (step 150), a multidimensional array data structure is updated based on received data without generating a new multidimensional array data structure. After the first ingestion operation as shown in FIG. 9, the OLAP cube stores newly appended delta values for each ingested key.

Although certain specific embodiments are described above for instructional purposes, the teachings of this patent document have general applicability and are not limited to the specific embodiments described above. Various embodiments disclosed involve financial applications, however, it is appreciated that these novel techniques and systems are applicable to any type of multi-dimensional time series data stored and ingested in any significant quantity. Accordingly, various modifications, adaptations, and combinations of various features of the described embodiments can be practiced without departing from the scope of the invention as set forth in the claims.

What is claimed is:

1. A method comprising:
   receiving pre-aggregated data postings from application functional modules;
   consolidating the pre-aggregated data postings prior to ingestion to generate consolidated received data;
   determining delta information by comparing consolidated received data to stored aggregated data in accordance with delta determination rules;
   appending delta information to the stored aggregated data using an append-only ingestion command of a multi-dimensional database engine, wherein existing stored values are not overwritten and no new multidimensional array structure is generated; and
   updating a multidimensional array data structure based on received data, wherein the multidimensional array data structure is an Online Analytical Processing (OLAP) cube, and wherein the updating is performed without requiring re-aggregation of raw transaction-level data.

2. The method of claim 1, wherein the delta information is appended to the stored data via append commands, and wherein consolidated received data is ingested without deleting or replacing stored data.

3. The method of claim 1, further comprising:
   aggregating data received from one or more data sources in accordance with aggregation rules.

4. The method of claim 3, wherein the one or more data sources include internal data sources and external data sources.

5. The method of claim 1, wherein the multidimensional array data structure is updated based on consolidated received data without generating a new multidimensional array data structure.

6. The method of claim 5, wherein the OLAP cube is generated based on the stored data, and wherein portions of the OLAP cube are updated based on consolidated received data without having to generate a new OLAP cube.

7. The method of claim 1, wherein consolidated received data is ledger data obtained from internal spreadsheets, external systems via data integration pipelines, or consolidation data sources.

8. The method of claim 1, wherein the data is stored in a relational database management system (RDBMS).

9. The method of claim 1, wherein the consolidated received data and the stored data are time series data.

10. A multidimensional data aggregation and ingestion (MMDAI) computing device comprising:
    a multidimensional data aggregation and ingestion memory that stores pre-aggregated data postings from application functional modules; and
    a multidimensional data aggregation and ingestion processor that consolidates the pre-aggregated data postings across the functional modules to generate consolidated received data, determines delta information by comparing the consolidated received data to stored aggregated data in accordance with delta determination rules, and appends the delta information to the stored aggregated data using an append-only ingestion command of a multidimensional database engine, wherein existing stored values are not overwritten and no new multidimensional array structure is generated wherein the multidimensional data aggregation and ingestion processor updates a multidimensional array data structure based on received data, wherein the multidimensional array data structure is an Online Analytical Processing (OLAP) cube, and wherein the updating is performed without requiring re-aggregation of raw transaction-level data.

11. The system of claim 10, further comprising;
    a relational database management system (RDBMS), wherein the delta information is appended to stored data in the RDBMS via append commands, and wherein consolidated received data is ingested without deleting or replacing stored data.

12. The system of claim 10, wherein the multidimensional data aggregation and ingestion processor aggregates data received from one or more data sources in accordance with aggregation rules.

13. The system of claim 12, wherein the one or more data sources include internal data sources and external data sources.

14. The system of claim 10, wherein the multidimensional data aggregation and ingestion processor updates the multidimensional array data structure based on consolidated received data without generating a new multidimensional array data structure.

15. The system of claim 14, wherein the OLAP cube is generated based on the stored data, and wherein portions of the OLAP cube are updated based on consolidated received data without having to generate a new OLAP cube.

16. The system of claim 10, wherein consolidated received data is ledger data obtained from internal spreadsheets, external systems via data integration pipelines, or consolidation data sources.

17. The system of claim 10, wherein the consolidated received data and the stored data are general ledger data.

18. A computer-readable medium storing instructions that, when executed by a processor, cause the processor to perform a method, the method comprising:
    receiving pre-aggregated data postings from application functional modules;
    consolidating the pre-aggregated data postings across the functional modules to generate consolidated received data;
    determining delta information by comparing consolidated received data to stored aggregated data in accordance with delta determination rules;
    appending delta information to the stored aggregated data using an append-only ingestion command of a multi-dimensional database engine, wherein existing stored values are not overwritten and no new multidimensional array structure is generated; and
    updating a multidimensional array data structure based on consolidated received data, wherein the multidimensional array data structure in an Online Analytical Processing (OLAP) cube, and wherein the updating is performed without requiring re-aggregation of raw transaction-level data.

19. The computer-readable medium of claim 18, wherein the delta information is appended to the stored data via append commands, and wherein consolidated received data is ingested without deleting or replacing stored data.

20. The computer-readable medium of claim 18, wherein the multidimensional array data structure is updated based on consolidated received data without generating a new multidimensional array data structure, the method further comprising:

aggregating data received from one or more data sources in accordance with aggregation rules.

\* \* \* \* \*